(12) United States Patent
Kohno et al.

(10) Patent No.: US 8,451,108 B2
(45) Date of Patent: May 28, 2013

(54) ON-VEHICLE INFORMATION PROVIDING DEVICE

(75) Inventors: Atsushi Kohno, Tokyo (JP); Reiko Okada, Tokyo (JP); Kiyoshi Matsutani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 602 days.

(21) Appl. No.: 12/669,027

(22) PCT Filed: Jun. 6, 2008

(86) PCT No.: PCT/JP2008/001446
§ 371 (c)(1),
(2), (4) Date: Jan. 13, 2010

(87) PCT Pub. No.: WO2009/047874
PCT Pub. Date: Apr. 16, 2009

(65) Prior Publication Data
US 2010/0182140 A1     Jul. 22, 2010

(30) Foreign Application Priority Data

Oct. 12, 2007   (JP) ................. 2007-266879

(51) Int. Cl.
*B60Q 1/00*   (2006.01)
*B60K 35/00*   (2006.01)

(52) U.S. Cl.
CPC ........................... *B60K 35/00* (2013.01)
USPC ........... 340/438; 340/439; 340/441; 340/988; 340/435; 701/400; 701/418; 701/423

(58) Field of Classification Search
CPC ......... B60K 35/00; B60K 37/00; G07C 5/0008
USPC ........... 340/439, 438, 441, 988, 435, 955.16, 340/990; 701/123, 200, 209, 50, 400, 418, 701/423; 348/125
See application file for complete search history.

(56) References Cited

U.S. PATENT DOCUMENTS 5,465,079 A     11/1995 Bouchard et al.
6,091,323 A  *   7/2000 Kawai ........................... 340/435
(Continued)

FOREIGN PATENT DOCUMENTS

DE        10235889 A1      2/2004
DE        10329054 A1      1/2005
(Continued)

*Primary Examiner* — Hoi Lau
(74) *Attorney, Agent, or Firm* — Birch, Stewart, Kolasch & Birch, LLP

(57) ABSTRACT

In an on-vehicle information providing device including an input device 1 for inputting information corresponding to operation, on-vehicle information equipment 2 for executing processing corresponding to the information input, an active safety system 3 for monitoring surrounding conditions of the vehicle and generating caution information, a liquid crystal display device 4 for displaying a processing result of the on-vehicle information equipment, and a head-up display (HUD) 5 for displaying the information delivered from the on-vehicle information equipment or from active safety system, the on-vehicle information equipment sends, if any display interrupt request is made from the active safety system during execution of the display processing onto the HUD, a display switching control request to the HUD by suspending the display processing, and the HUD switches from a state of displaying the information from the on-vehicle information equipment to a state of displaying the information from the active safety system in response to the display switching control request from the on-vehicle information equipment.

16 Claims, 13 Drawing Sheets

U.S. PATENT DOCUMENTS

| | | | |
|---|---|---|---|
| 2004/0204823 A1* | 10/2004 | Hashimoto | 701/200 |
| 2006/0047425 A1* | 3/2006 | Fukumi et al. | 701/209 |
| 2006/0111836 A1 | 5/2006 | Fast et al. | |
| 2006/0256094 A1* | 11/2006 | Inagaki | 345/173 |
| 2007/0150171 A1* | 6/2007 | Tengler et al. | 701/123 |
| 2008/0042816 A1* | 2/2008 | Pennisi et al. | 340/441 |
| 2009/0009308 A1* | 1/2009 | Date et al. | 340/439 |
| 2009/0051516 A1 | 2/2009 | Abel et al. | |
| 2009/0146846 A1* | 6/2009 | Grossman | 340/988 |

FOREIGN PATENT DOCUMENTS

| | | |
|---|---|---|
| DE | 102004037231 A1 | 2/2006 |
| DE | 102005050859 A1 | 6/2006 |
| DE | 102006008981 A1 | 8/2007 |
| JP | 5-196632 A | 8/1993 |
| JP | 10-104005 A | 4/1998 |
| JP | 2001-116567 A | 4/2001 |
| JP | 2002-92793 A | 3/2002 |
| JP | 2003-16595 A | 1/2003 |
| JP | 2003-81040 A | 3/2003 |
| JP | 2005-14788 A | 1/2005 |
| JP | 2007-128427 A | 5/2007 |
| JP | 2007-323333 A | 12/2007 |
| WO | WO 2006/013125 A1 | 2/2006 |

* cited by examiner

| Danger Levels | Display Duration (Seconds) |
|---|---|
| 10 | 5 |
| 20 | 10 |
| ⋮ | ⋮ |
| 100 | 30 |

FIG. 7

| Display Duration (Seconds) | Thresholds |
|---|---|
| 5 | 10 |
| 10 | 20 |
| ⋮ | ⋮ |
| 30 | 60 |

FIG. 8

| | Upper Left Coordinates of Rectangle | Lower Right Coordinates of Rectangle | Thresholds |
|---|---|---|---|
| Area 1 | N35.xxx E135.xxx | N36.xxx E136.xxx | 10 |
| ⋮ | ⋮ | ⋮ | ⋮ |
| Area N | N34.xxx E134.xxx | N35.xxx E135.xxx | 50 |

FIG. 9

| Link ID | Number of Times |
|---|---|
| 0x1000 | 5 |
| 0x1001 | 2 |
| ⋮ | ⋮ |
| 0x1100 | 4 |
| 0x1101 | 3 |

FIG. 14

| Steering Angle | Thresholds for Deciding Operation Continuation |
|---|---|
| 0 < P < p1 | 50 |
| p1 < P < p2 | 40 |
| p2 < P < p3 | 30 |
| P > p3 | 10 |

FIG. 16

| Driving Leeway | Thresholds |
|---|---|
| Having Leeway | 50 |
| Lacking in Leeway | 20 |

FIG. 18

| Thresholds of Driving Skill | Thresholds for Deciding Operation Continuation |
|---|---|
| 0 < Q < q1 | 0 |
| q1 < Q < q2 | 25 |
| q2 < Q < q3 | 50 |
| Q > q3 | 75 |

ON-VEHICLE INFORMATION PROVIDING DEVICE

TECHNICAL FIELD

The present invention relates to an on-vehicle information providing device for providing a user with information on the vehicle such as navigation information and active safety information, and particularly to a technique of providing the information using a head-up display (HUD).

BACKGROUND ART

Recently, an active safety system that watches surrounding conditions of a vehicle and gives a caution to a driver has come to be mounted thereon. To provide information by the active safety system, a head-up display is often used to display information on the front window in front of the driver to reduce driver's sight-line transfer.

On the other hand, to operate on-vehicle information equipment typified by a car navigation system safely even during running, the voice operation using a voice recognition technology has been spread, and displaying a voice operation result using a head-up display makes it possible to achieve safer voice operation.

However, preparing the head-up displays for the on-vehicle information equipment and the active safety system separately will increase the cost. To solve such a problem, Patent Document 1 discloses an on-vehicle driving support information display device for providing the driver with information on safety around the vehicle as well as information necessary for vehicle traveling such as a navigation system. The on-vehicle driving support information display device comprises a display means for displaying an image; a navigation system for detecting the current position of the vehicle and for displaying it on the screen of the display means together with a map around the position of the vehicle; a vehicle-surrounding information display device for creating a bird's-eye view around the vehicle by combining images acquired with a plurality of cameras mounted on the vehicle and for displaying it on the screen of the display means; and an information selecting means for selecting to switch between the screen display by the navigation system and the screen display by the vehicle-surrounding information display device optionally by a touch screen or voice recognition means.

Patent Document 1: Japanese Patent Laid-Open No. 2001-116567.

However, a configuration such as the on-vehicle driving support information display device disclosed in the foregoing Patent Document 1, which shares the head-up display and switches it with the touch screen or voice recognition means, has a problem of being unable to provide the information from the active safety system quickly when a caution from the active safety system must be issued during the operation of the on-vehicle information equipment.

The present invention is implemented to solve the foregoing problems. Therefore it is an object of the present invention to provide an on-vehicle information providing device capable of providing the information from the active safety system quickly and preventing the operation of the on-vehicle information equipment carried out so far from coming to nothing.

DISCLOSURE OF THE INVENTION

To solve the foregoing problems, the on-vehicle information providing device in accordance with the present invention includes: an input device for inputting information corresponding to operation; an on-vehicle information device for executing processing corresponding to the information input from the input device; a vehicle safety device for generating caution information to a driver of a vehicle; a first display device for displaying a processing result of the on-vehicle information device; and a second display device for displaying information delivered from the on-vehicle information device or from the vehicle safety device, in which the on-vehicle information device, while executing display processing onto the second display device, suspends the display processing and sends a display switching control request to the second display device in response to a display interrupt request from the vehicle safety device; and the second display device switches, in response to the display switching control request from the on-vehicle information device, from a state of displaying the information from the on-vehicle information device to a state of displaying the information from the vehicle safety device.

According to the on-vehicle information providing device in accordance with the present invention, when the second display device, which can reduce the driver's sight-line transfer, is shared between the display of a response to the operation of the on-vehicle information device such as a car navigation system and the display for providing the information of the vehicle safety device, since the on-vehicle information device suspends the display of the response to its operation even during the operation and switches to providing information of the vehicle safety device, it can provide the user with the information of the vehicle safety device quickly according to priority.

BRIEF DESCRIPTION OF THE DRAWINGS

FIG. 7 is a table showing relationships between display duration and thresholds used by the another rear-end collision active safety device constituting the on-vehicle information providing device of the embodiment 1 in accordance with the present invention;

FIG. 8 is a table showing an example of areas used by the on-vehicle information providing device of an embodiment 2 in accordance with the present invention;

FIG. 9 is a table showing a running history of a vehicle used by the on-vehicle information providing device of the embodiment 2 in accordance with the present invention;

FIG. 14 is a table showing relationships between steering angles and thresholds used by the on-vehicle information providing device of the embodiment 4 in accordance with the present invention;

FIG. 16 is a diagram showing an example of a table for making a leeway decision used by the on-vehicle information providing device of the embodiment 5 in accordance with the present invention;

FIG. 18 is a diagram showing an example of a table for making a driving skill decision used by the on-vehicle information providing device of the embodiment 5 in accordance with the present invention.

BEST MODE FOR CARRYING OUT THE INVENTION

The best mode for carrying out the invention will now be described with reference to the accompanying drawings to explain the present invention in more detail.

Embodiment 1

Figure 1:
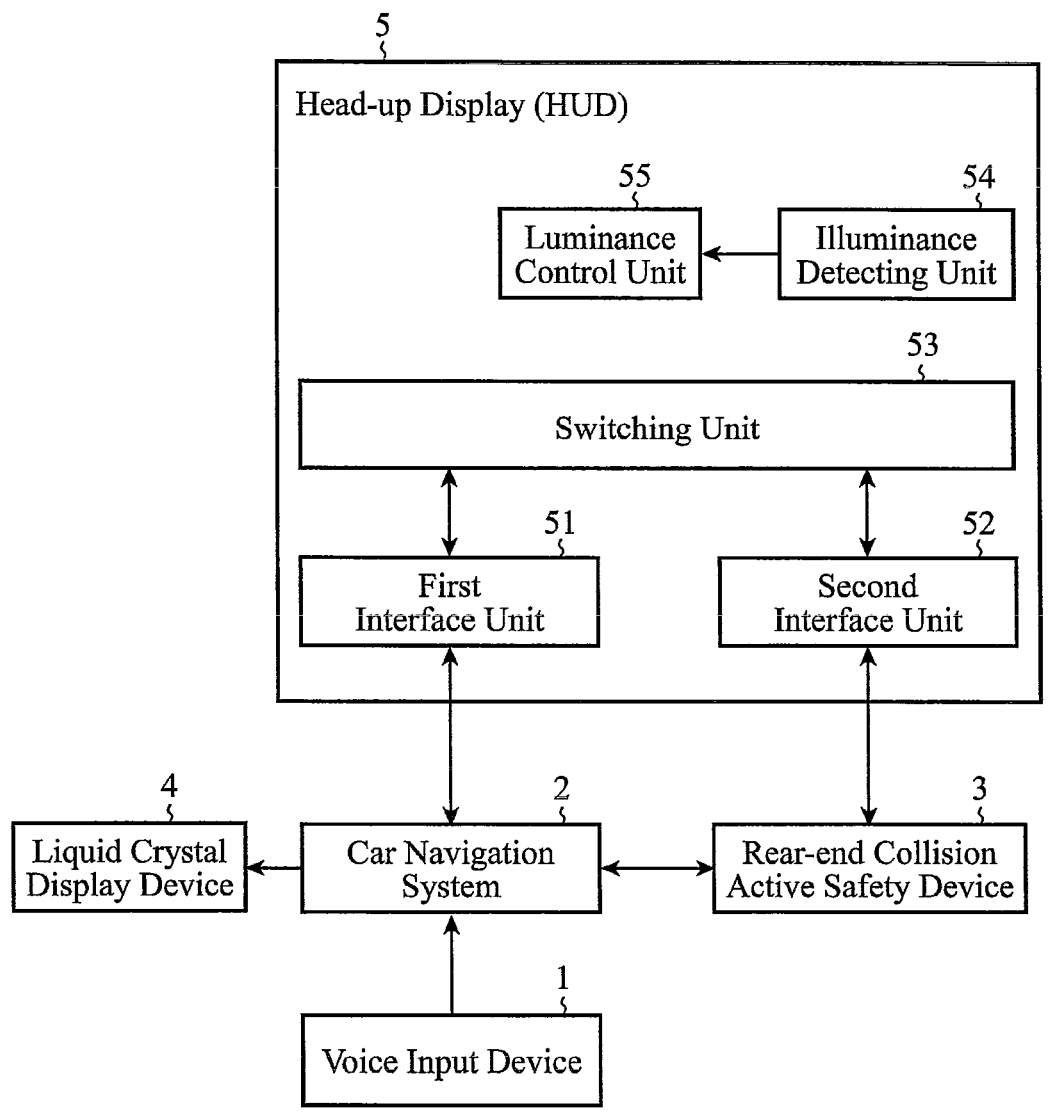
FIG. 1 is a block diagram showing a configuration of an on-vehicle information providing device of an embodiment 1 in accordance with the present invention.

FIG. 1 is a block diagram showing a configuration of an on-vehicle information providing device of an embodiment 1 in accordance with the present invention. The on-vehicle information providing device includes a voice input device 1, a car navigation system 2, a rear-end collision active safety device 3, a liquid crystal display device 4 as a first display device and a head-up display (HUD) 5 as a second display device.

The voice input device 1, which corresponds to the input device in accordance with the present invention, is composed of a microphone, for example. The voice input device 1 converts the voice a user utters to an electric signal and delivers it to the car navigation system 2.

The car navigation system 2, which corresponds to on-vehicle information equipment serving as the on-vehicle information device in accordance with the present invention, executes, in response to instructions from the voice input device 1, various processing such as map display processing, route search processing, route information processing, facility search processing or address search processing. The information obtained by the processing in the car navigation system 2 is delivered to the liquid crystal display device 4 and/or head-up display 5 to be displayed. Details of the car navigation system 2 will be described later.

The rear-end collision active safety device 3, which corresponds to an active safety system serving as a vehicle safety device in accordance with the present invention, calculates the danger level corresponding to the distance from the vehicle in front (referred to as "following distance" from now on), makes a decision whether to give a caution to the driver according to the danger level calculated, and delivers, if the caution is necessary, a display interrupt request and the danger level calculated to the car navigation system 2 as an emergency level, and a caution message to the head-up display 5. Details of the rear-end collision active safety device 3 will be described later.

The liquid crystal display device 4, which is also called a liquid crystal monitor or liquid crystal display, displays the navigation information delivered from the car navigation system 2 such as a map or recommended route.

The head-up display 5 displays one of the navigation information delivered from the car navigation system 2 and the active safety information such as a caution message delivered from the rear-end collision active safety device 3 by switching them. The head-up display 5 includes a first interface unit 51, a second interface unit 52 and a switching unit 53. The first interface unit 51 controls the transmission and reception of the information between the car navigation system 2 and the head-up display 5. The second interface unit 52 controls the transmission and reception of the information between the rear-end collision active safety device 3 and the head-up display 5. The switching unit 53 switches whether to obtain the information to be displayed on the head-up display 5 from the first interface unit 51 or from the second interface unit 52. Incidentally, an illuminance detecting unit 54 and a luminance control unit 55 are optional, and their details will be described later.

Figure 2:
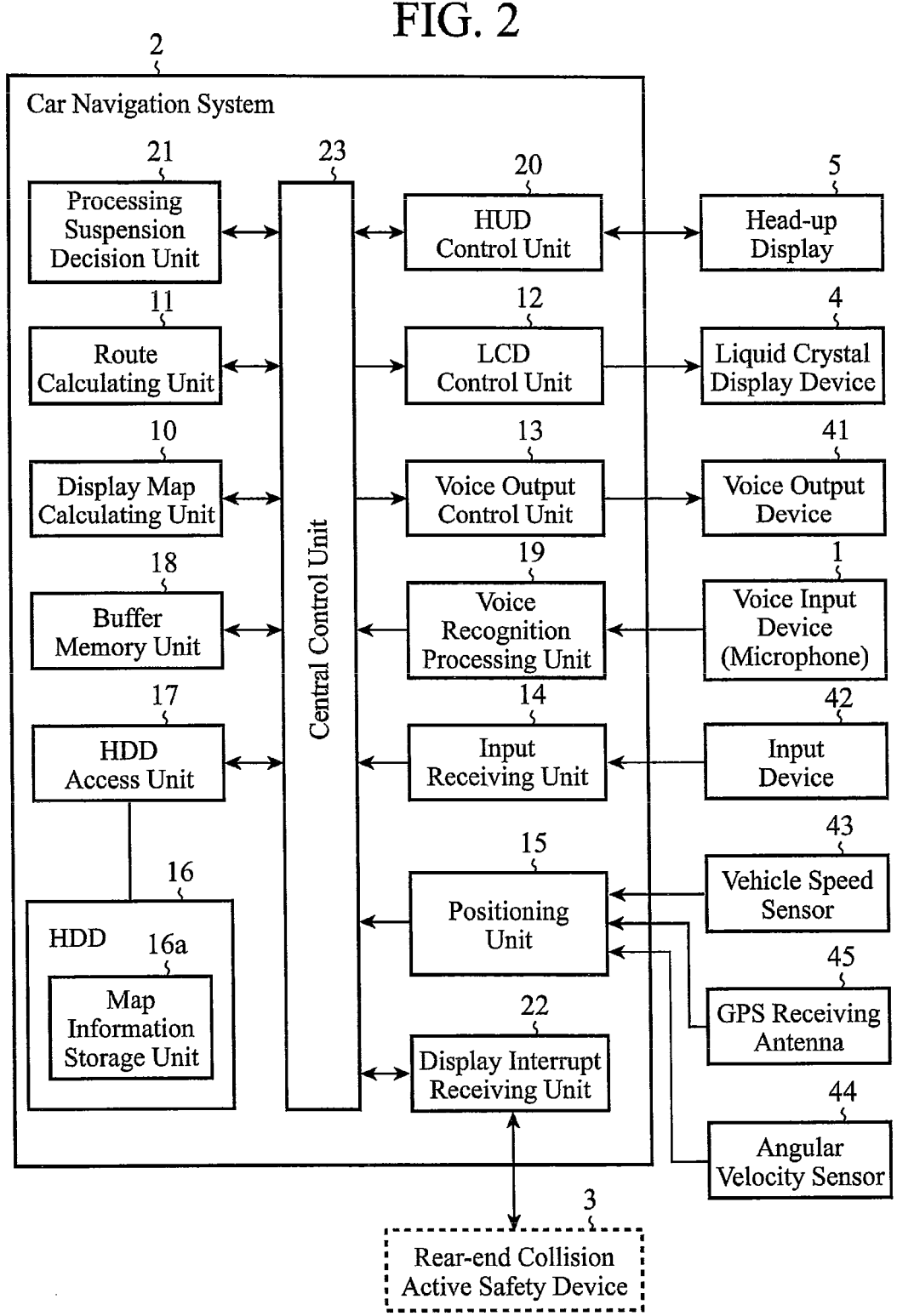
FIG. 2 is a block diagram showing a configuration of a car navigation system constituting the on-vehicle information providing device of the embodiment 1 in accordance with the present invention.

Next, details of the car navigation system 2 will be described. FIG. 2 is a block diagram showing a configuration of the car navigation system 2. Incidentally, in FIG. 2, a voice output device 41, an input device 42, a vehicle speed sensor 43, an angular velocity sensor 44 and a GPS (Global Positioning System) receiving antenna 45 are depicted as separate components from the car navigation system 2 for convenience' sake.

The car navigation system 2 includes a display map calculating unit 10, a route calculating unit 11, an LCD (Liquid Crystal Display) control unit 12, a voice output control unit 13, an input receiving unit 14, a positioning unit 15, an HDD (Hard Disk Drive) 16, an HDD access unit 17, a buffer memory unit 18, a voice recognition processing unit 19, an HUD control unit 20, a processing suspension decision unit 21, a display interrupt receiving unit 22 and a central control unit 23. The HDD 16 has a map information storage unit 16a.

The central control unit 23 controls, in accordance with procedures programmed in advance, the start and stop of the display map calculating unit 10, route calculating unit 11, LCD control unit 12, voice output control unit 13, input receiving unit 14, positioning unit 15, HDD access unit 17, buffer memory unit 18, voice recognition processing unit 19, HUD control unit 20, processing suspension decision unit 21 and display interrupt receiving unit 22, and the transmission and reception of data between these components. In the following description, to avoid complicating explanations, descriptions will be omitted that the transmission and reception of the data between the foregoing components are carried out via the central control unit 23.

The display map calculating unit 10 calculates a map image to be displayed from the map information read out of the map information storage unit 16a of the HDD 16 via the HDD access unit 17. The map image obtained by the calculation in the display map calculating unit 10 is delivered to the LCD control unit 12. The route calculating unit 11 calculates a recommended route between the starting point delivered from the input receiving unit 14 or the current position delivered from the positioning unit 15 and a destination delivered from the input receiving unit 14 on the basis of the map information read out of the map information storage unit 16a of the HDD 16 via the HDD access unit 17. The recommended route calculated by the route calculating unit 11 is delivered to the LCD control unit 12.

The LCD control unit 12 converts the map image to be displayed delivered from the display map calculating unit 10 or the recommended route delivered from the route calculating unit 11 to a signal with a format displayable on the liquid crystal display device 4, and delivers it to the liquid crystal display device 4. Thus, the liquid crystal display device 4 displays the map and recommended route and the like. The voice output control unit 13 converts, in accordance with the recommended route delivered from the route calculating unit 11, the voice information for guiding to the destination or the voice information for notifying the driver of the information contained in the map information to a signal with a format that can be output from the voice output device 41, and delivers it to the voice output device 41.

The input receiving unit 14 receives the signal delivered from the input device 42, and delivers it to the display map calculating unit 10 or route calculating unit 11. The positioning unit 15 detects the current position of the vehicle from the signals delivered from the vehicle speed sensor 43, angular velocity sensor 44 and GPS receiving antenna 45, and calculates the coordinates of the current position of the vehicle. The calculated coordinates are delivered to the display map calculating unit 10, route calculating unit 11 or processing suspension decision unit 21 as a positioning result.

The HDD 16 has the map information storage unit 16a for storing the map information. The map information storage unit 16a has stored the map information including road data at the shipment of the on-vehicle information providing device. The HDD access unit 17 controls writing data to the HDD 16 and reading data from the HDD 16 in response to the instructions from the central control unit 23.

The buffer memory unit 18, which is composed of a volatile memory, for example, is used for temporarily storing various information. When executing processing using the road data contained in the map information stored in the HDD 16, each component connected to the central control unit 23 reads the map information to be used in the processing from the HDD 16 via the HDD access unit 17, and stores the information read out into the buffer memory unit 18 to use it.

The voice recognition processing unit 19 recognizes the uttered voice from the voice signal delivered from the voice input device 1. A word or words obtained by the voice recognition in the voice recognition processing unit 19 are delivered to the head-up display 5 via the HUD control unit 20. The HUD control unit 20 converts the word or words delivered from the voice recognition processing unit 19 to a signal with a format displayable on the head-up display 5, and delivers it to the head-up display 5. Thus, the head-up display 5 displays the word or words uttered for the voice operation.

The processing suspension decision unit 21 compares the danger level (emergency level) received from the rear-end collision active safety device 3 via the display interrupt receiving unit 22 with the threshold which is stored in its inside and is used for making a decision of the display processing suspension, and decides whether to suspend the display processing onto the head-up display 5. Then, if it makes a decision of suspension, it sends the control signal notifying of that to the HUD control unit 20 to discontinue the display on the head-up display 5.

The display interrupt receiving unit 22 receives the display interrupt request and the information indicating the danger level delivered from the rear-end collision active safety device 3. The display interrupt request and the information indicating the danger level received by the display interrupt receiving unit 22 are delivered to the processing suspension decision unit 21.

Among the devices connected to the car navigation system 2, since the voice input device 1, liquid crystal display device 4 and head-up display 5 have been described already, their description will be omitted here. As for the voice output device 41, it is composed of a speaker, for example, and outputs in voice the information contained in the guidance or map information up to the destination along the recommended route according to the voice signal delivered from the voice output control unit 13.

The input device 42 is used, when the voice operation is not used, for inputting a map area to be displayed on the liquid crystal display device 4 or for inputting a starting point or a terminal when calculating the recommended route. The input device 42 can be constructed from input buttons fixed on the main panel in the front of the car navigation system 2, a remote controller for sending an input signal equivalent to the input buttons, a touch screen set on the screen of the liquid crystal display device 4, or a combination of them.

The vehicle speed sensor 43 detects the speed at which the vehicle moves from the vehicle speed pulses delivered from the vehicle not shown. The speed detected by the vehicle speed sensor 43 is delivered to the positioning unit 15. The angular velocity sensor 44 detects changes in the direction of the vehicle. The changes in the direction detected by the angular velocity sensor 44 are delivered to the positioning unit 15. The GPS receiving antenna 45 receives radio waves sent from GPS satellites. The GPS signals obtained by receiving the radio waves by the GPS receiving antenna 45 are delivered to the positioning unit 15.

Next, the operation of the car navigation system 2 with the foregoing configuration will be described. Since the basic operation of the car navigation system 2 is the same as that of an existing car navigation system, the processing carried out by the head-up display 5 for making a response to the voice operation by the car navigation system 2 via the voice input device 1 will be described.

Now, consider a case of searching for address information "Hyogo Prefecture, Sanda City, 2-3-33 Miwa", which is stored in the car navigation system 2, by the voice operation. When a user utters words "Hyogo Prefecture", the voice input device 1 converts the voice of the user to a voice signal and delivers it to the voice recognition processing unit 19. The voice recognition processing unit 19 makes a decision that the voice signal corresponds to "Hyogo Prefecture" by referring to the input voice signal and a voice recognition dictionary retained inside the unit or stored in the HDD 16, and controls the HUD control unit 20 to display a message ""Hyogo Prefecture", please talk the following address"" on the head-up display 5.

After that, when the user utters words "Sanda City", it recognizes "Sanda City" and displays a message ""Hyogo Prefecture, Sanda City". Please talk the following address"" on the head-up display 5. In the same manner, every time recognizing "2", "3", "33" and "Miwa", it carries out the processing of displaying the message including the recognition result on the head-up display 5. Thus, the user need not shift his or her line of sight toward the liquid crystal display device 4 which is the main display of the car navigation system 2, which enables safer voice operation.

Figure 3:
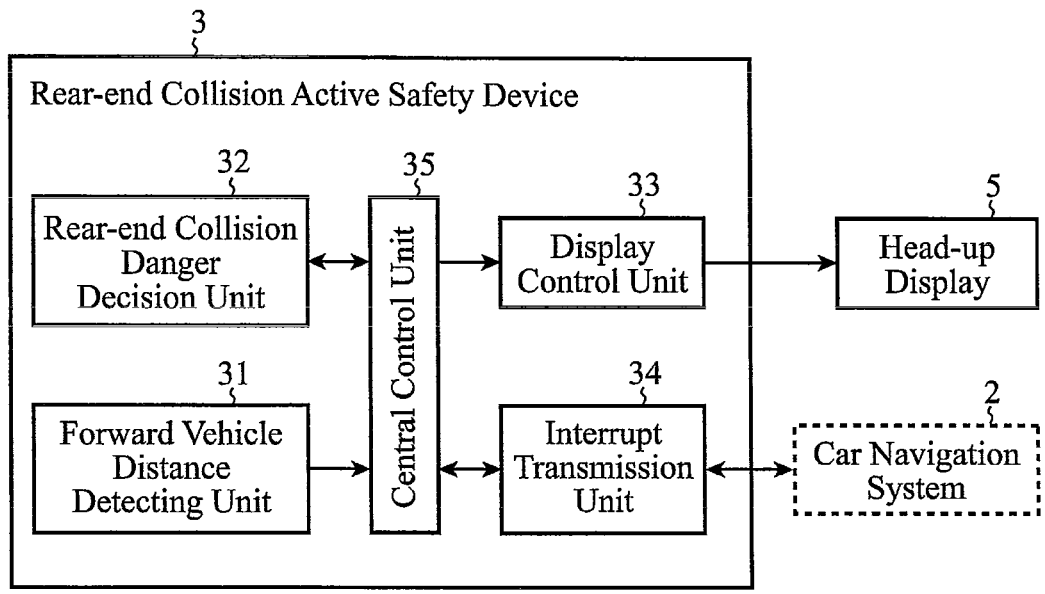
FIG. 3 is a block diagram showing a configuration of a rear-end collision active safety device constituting the on-vehicle information providing device of the embodiment 1 in accordance with the present invention.

Next, details of the rear-end collision active safety device 3 will be described. FIG. 3 is a block diagram showing a configuration of the rear-end collision active safety device 3. The rear-end collision active safety device 3 includes a forward vehicle distance detecting unit 31, a rear-end collision danger decision unit 32, a display control unit 33, an interrupt transmission unit 34 and a central control unit 35. The central control unit 35 controls the whole operation of the rear-end collision active safety device 3 by controlling transmission and reception of data between the forward vehicle distance detecting unit 31, rear-end collision danger decision unit 32, display control unit 33 and interrupt transmission unit 34.

The forward vehicle distance detecting unit 31 detects the distance from the vehicle to a vehicle ahead of it, that is, the following distance, using a millimeter wave or infrared rays. The following distance detected by the forward vehicle distance detecting unit 31 is delivered to the central control unit 35.

The rear-end collision danger decision unit 32 compares the following distance delivered from the forward vehicle distance detecting unit 31 via the central control unit 35 with a preset threshold and calculates the danger level. For example, it calculates the danger level in such a manner that if the following distance is less than a threshold d1, the danger level is 100, if it is equal to or greater than the threshold d1 and less than d2, the danger level is 50, and if it is equal to or greater than the threshold d2, the danger level is zero. In addition, the rear-end collision danger decision unit 32 decides whether to issue a caution to the driver in accordance with the danger level calculated (for example, issue a caution if the danger level is greater than zero). If the caution is necessary, it delivers the danger level calculated and a display interrupt request to the display control unit 33 and interrupt transmission unit 34 via the central control unit 35.

The display control unit 33 generates a caution message from the display interrupt request and the danger level delivered from the rear-end collision danger decision unit 32 via the central control unit 35, and delivers it to the head-up display 5. Thus, the head-up display 5 displays the caution message including the danger level.

The interrupt transmission unit 34 sends to the car navigation system 2 the display interrupt request and the danger level delivered from the rear-end collision danger decision unit 32 via the central control unit 35. Thus, when the car navigation system 2 is carrying out display processing on the head-up display 5 at that point of time, it suspends the display processing (its detail will be described later).

Next, the operation of the on-vehicle information providing device of the embodiment 1 in accordance with the present invention with the foregoing configuration will be described with reference to the sequence chart shown in FIG. 4 centering on the processing of causing an interrupt to the display processing the rear-end collision active safety device 3 is executing in the car navigation system 2 and of displaying a message on the head-up display 5.

First, when the rear-end collision active safety device 3 decides that it is necessary to output the caution message, it sends the display interrupt request accompanied with the danger level to the car navigation system 2 (S11). The processing suspension decision unit 21 of the car navigation system 2 that receives the danger level from the rear-end collision active safety device 3 compares the danger level with a preset threshold a1 used for deciding the display processing suspension, and decides whether to enable an interrupt to suspend the current display processing or to disable it to continue the current display processing. Then, when making a decision of enabling the interrupt, the processing suspension decision unit 21 sends a display interrupt authorization to the rear-end collision active safety device 3 via the display interrupt receiving unit 22 (S12), and at the same time sends a display switching control request to the head-up display 5 via the HUD control unit 20 (S13).

Receiving the display interrupt authorization from the car navigation system 2 via the interrupt transmission unit 34, the central control unit 35 of the rear-end collision active safety device 3 activates the display control unit 33, and starts the display processing on the head-up display 5 (S14). On the other hand, receiving the display switching control request from the car navigation system 2, the head-up display 5 switches the interface to be used for display from the first interface unit 51 to the second interface unit 52 (S15). Then, when the switching has been completed, it sends a switching completion notification to the car navigation system 2 (S16). Receiving the switching completion notification from the head-up display 5 via the HUD control unit 20, the processing suspension decision unit 21 of the car navigation system 2 suspends the display processing onto the head-up display 5 (S17). Thus, even while the car navigation system 2 is executing the display processing onto the head-up display 5, the display processing is suspended to enable the display processing of the rear-end collision active safety device 3 on the head-up display 5.

As described above, according to the on-vehicle information providing device of the embodiment 1 in accordance with the present invention, when the head-up display 5, which can reduce the driver's sight-line transfer, is shared between the display of a response to the voice operation of the car navigation system 2 and the display for providing the active safety information of the rear-end collision active safety device 3, since the head-up display 5 can suspend the response to the voice operation even during the voice operation of the car navigation system 2 and can switch to providing the active safety information of the rear-end collision active safety device 3, it can provide the user with the active safety information of the rear-end collision active safety device 3 quickly according to priority.

Incidentally, in the foregoing on-vehicle information providing device, although the car navigation system 2 is configured in such a manner as to compare the danger level with the threshold a1 by the processing suspension decision unit 21, to decide whether to enable or disable the interrupt, and to transmit, when the interrupt is enabled, the display interrupt authorization to the rear-end collision active safety device 3, it can also be constructed in such a manner as to transmit the display interrupt authorization to the rear-end collision active safety device 3 right after receiving the display interrupt request without making any decision as to the danger level with the processing suspension decision unit 21.

In addition, when suspending the display processing on the head-up display 5 by enabling the interrupt from the rear-end collision active safety device 3 to carry out the display switching control, the processing suspension decision unit 21 can be configured in such a manner as to perform the display switching control after displaying a message of "Voice operation will be suspend" on the head-up display 5 to notify the user of the suspension of the voice operation processing. Alternatively, the processing suspension decision unit 21 can be constructed in such a manner as to display the message of "Voice operation will be suspended" on the liquid crystal display device 4 serving as the main display.

Furthermore, although the on-vehicle information providing device of the foregoing embodiment 1 is described by way of example in which the car navigation system 2 is operated by voice, a configuration is also possible which uses gesture operation that operates the car navigation system 2 according to the operation based on the gesture of the user recognized from images acquired by a camera, for example. In addition, the car navigation system 2 can also be constructed in such a manner as to operate with a combination of the voice operation and the gesture operation.

Moreover, although the car navigation system 2 is used as an example of the on-vehicle information equipment in the on-vehicle information providing device of the foregoing embodiment 1, various devices other than the car navigation system can be used as long as they are on-vehicle information equipment that can accept user operation and display the operation result just as a car audio device, for example. In addition, although the rear-end collision active safety device is used as an example of the active safety system, various systems other than the rear-end collision active safety device can be used as long as they are such active safety systems that are independent of the on-vehicle information equipment and can issue a caution to the driver.

Alternatively, a configuration is also possible which adds the illuminance detecting unit 54 for detecting the surrounding illuminance and the luminance control unit 55 for controlling the luminance on the head-up display 5 as shown in FIG. 1 so that the luminance control unit 55 alters the luminance of the head-up display 5 in accordance with the illuminance detected by the illuminance detecting unit 54. According to the configuration, it can prevent the user from feeling surprise at such a situation in which the display contents on the head-up display 5 are felt relatively bright in a tunnel or during night.

Figure 4:
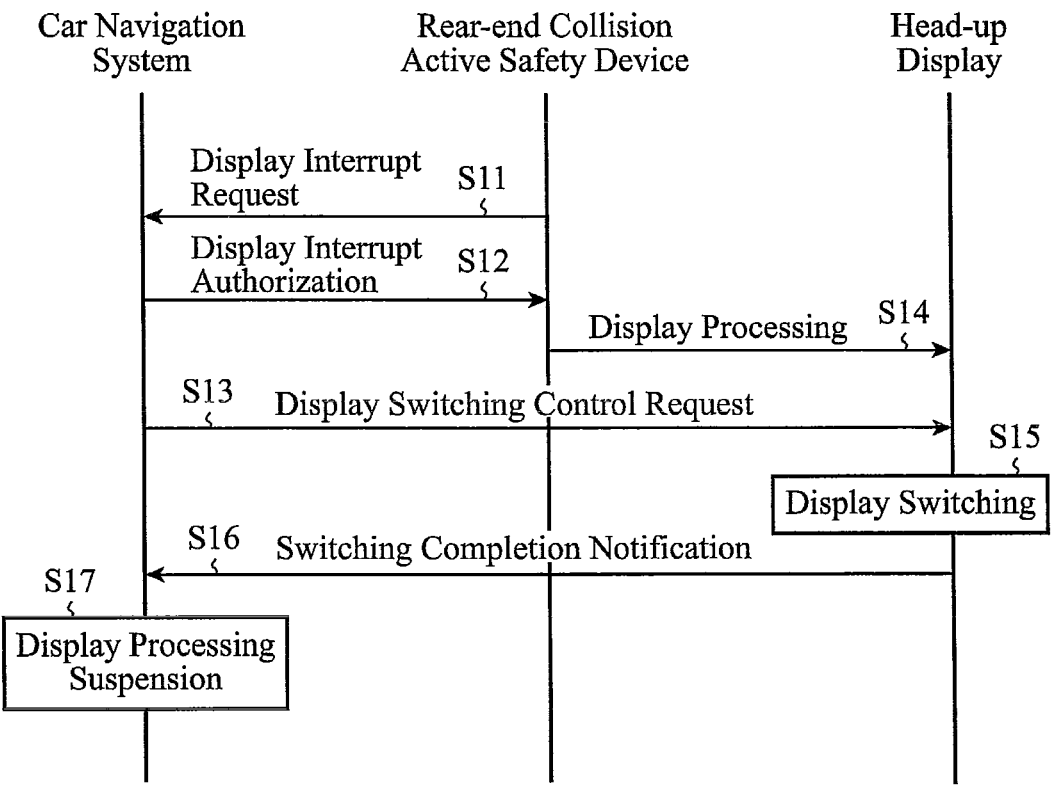
FIG. 4 is a sequence chart showing the operation of the on-vehicle information providing device of the embodiment 1 in accordance with the present invention.

In addition, although the on-vehicle information providing device of the foregoing embodiment 1 is configured in such a manner that after receiving the switching completion notification from the head-up display 5, the car navigation system 2 suspends the display processing on the head-up display 5 as shown in the sequence chart of FIG. 4, a configuration is also possible which switches the display device from the head-up display 5 to the liquid crystal display device 4, and executes the display processing on the liquid crystal display device 4. According to the configuration, even when it authorizes the interrupt from the rear-end collision active safety device 3, it can continue the voice operation of the car navigation system 2.

Furthermore, although the on-vehicle information providing device of the foregoing embodiment 1 is configured in such a manner as to decide whether to suspend the display processing in response to the danger level delivered from the rear-end collision active safety device 3, a configuration is also possible which transmits the display duration of the message from the rear-end collision active safety device 3 to the car navigation system 2 so that the car navigation system 2 uses the display duration delivered from the rear-end collision active safety device 3 as the threshold for making a decision of the display processing suspension, and makes a decision whether to continue the voice operation.

Figures 5, 6:
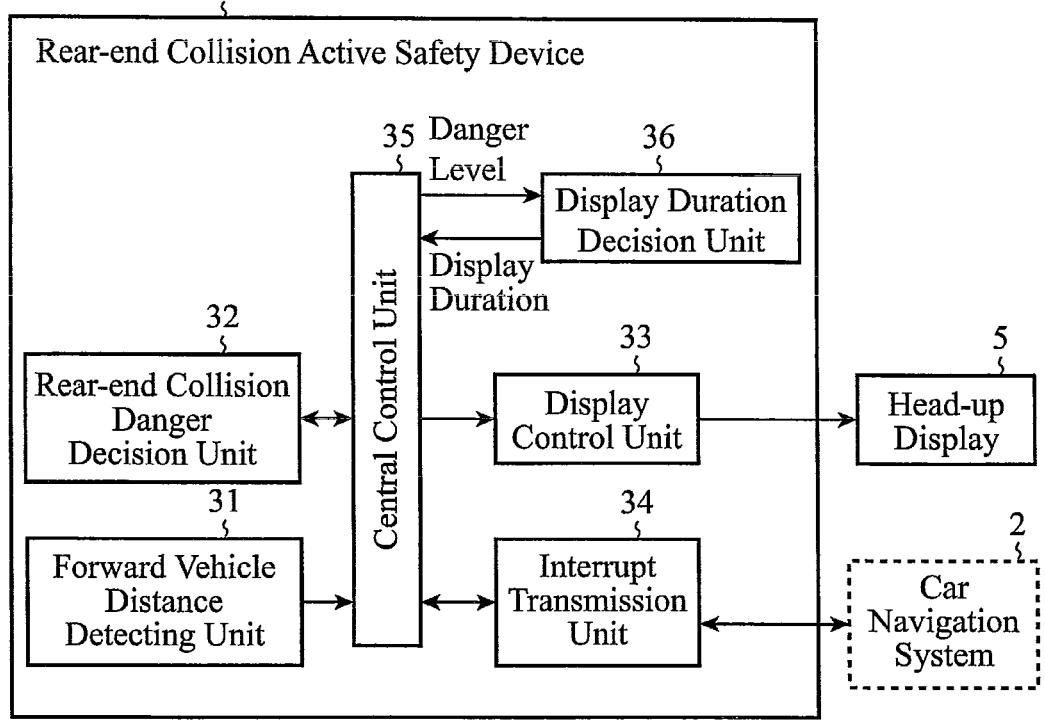
FIG. 5 is a block diagram showing another configuration of the rear-end collision active safety device constituting the on-vehicle information providing device of the embodiment 1 in accordance with the present invention.
FIG. 6 is a table showing relationships between the danger level and the display duration used by the another rear-end collision active safety device constituting the on-vehicle information providing device of the embodiment 1 in accordance with the present invention.

FIG. 5 is a block diagram showing a configuration of a rear-end collision active safety device 3a for achieving the function of making a decision whether to continue the voice operation according to the display duration of the message. The rear-end collision active safety device 3a comprises, in addition to the foregoing rear-end collision active safety device 3, a display duration decision unit 36. The display duration decision unit 36 calculates the display duration corresponding to the danger level delivered from the rear-end collision danger decision unit 32, and delivers it to the central control unit 35. The display duration decision unit 36 can be configured in such a manner as to store a table showing relationships between the danger level and the display duration as shown in FIG. 6, for example, and to calculate the display duration by referring to the table.

The central control unit 35 sends the display duration it receives from the display duration decision unit 36 to the display control unit 33. Thus, the time period during which the head-up display 5 displays the message is decided. In addition, the central control unit 35 sends the display duration it receives from the display duration decision unit 36 to the car navigation system 2 via the interrupt transmission unit 34.

The processing suspension decision unit 21 of the car navigation system 2 stores a table showing relationships between the display duration and thresholds as shown in FIG. 7, and decides whether to suspend the display processing onto the head-up display 5 using the threshold corresponding to the display duration received from the rear-end collision active safety device 3a. The operation after that is the same as the operation of the processing suspension decision unit 21 of the on-vehicle information providing device of the embodiment 1.

Embodiment 2

Although the on-vehicle information providing device of the foregoing embodiment 1 is configured in such a manner as to switch the display on the head-up display 5 regardless of the current position of the vehicle when a display interrupt request is received from the rear-end collision active safety device 3, the on-vehicle information providing device of the present embodiment 2 is configured in such a manner as to switch the display on the head-up display 5 considering the current position of the vehicle.

The configuration of the on-vehicle information providing device of the embodiment 2 in accordance with the present invention is the same as that of the on-vehicle information providing device of the foregoing embodiment 1. The on-vehicle information providing device of the embodiment 2 acquires the coordinates of the current position of the vehicle using the vehicle position detecting function of the car navigation system 2. More specifically, the positioning unit 15 detects the current position of the vehicle from the signals delivered from the vehicle speed sensor 43, angular velocity sensor 44 and GPS receiving antenna 45, and calculates the coordinates of the current position of the vehicle. The coordinates of the current position of the vehicle calculated by the positioning unit 15 are delivered to the processing suspension decision unit 21.

The processing suspension decision unit 21 decides whether to suspend the display processing onto the head-up display 5 depending on whether the coordinates of the current position of the vehicle received from the positioning unit 15 are within an area it stores within it. As the area, a rectangular region can be set which is defined by the upper left coordinates and lower right coordinates of a rectangle as shown in FIG. 8, for example. Then, if the processing suspension decision unit 21 makes a decision that the coordinates of the current position of the vehicle are within the area, it delivers the control signal informing of that to the HUD control unit 20, and suspends the display processing onto the head-up display 5.

Alternatively, as shown in FIG. 8, a configuration is also possible which sets a threshold for deciding whether to continue the voice operation or not (suspend the display processing or not) for each area, and decides whether to suspend the display processing onto the head-up display 5 using the thresholds set. According to the configuration, it can be used in such a manner as to increase the threshold near the user's house, but to reduce the threshold at locations the user rarely visits.

In addition, a configuration is also possible which decides whether to suspend the display processing onto the head-up display 5 or not on the basis of the road the vehicle is running instead of the coordinates of the current position of the vehicle. Since inherent link IDs are assigned to the road data contained in the map information stored in the car navigation system 2, a configuration is also possible which decides whether to suspend the display processing onto the head-up display 5 or not by setting thresholds for the link IDs and by comparing the link ID of the position of the vehicle detected by the car navigation system 2 with the threshold.

Figure 10:
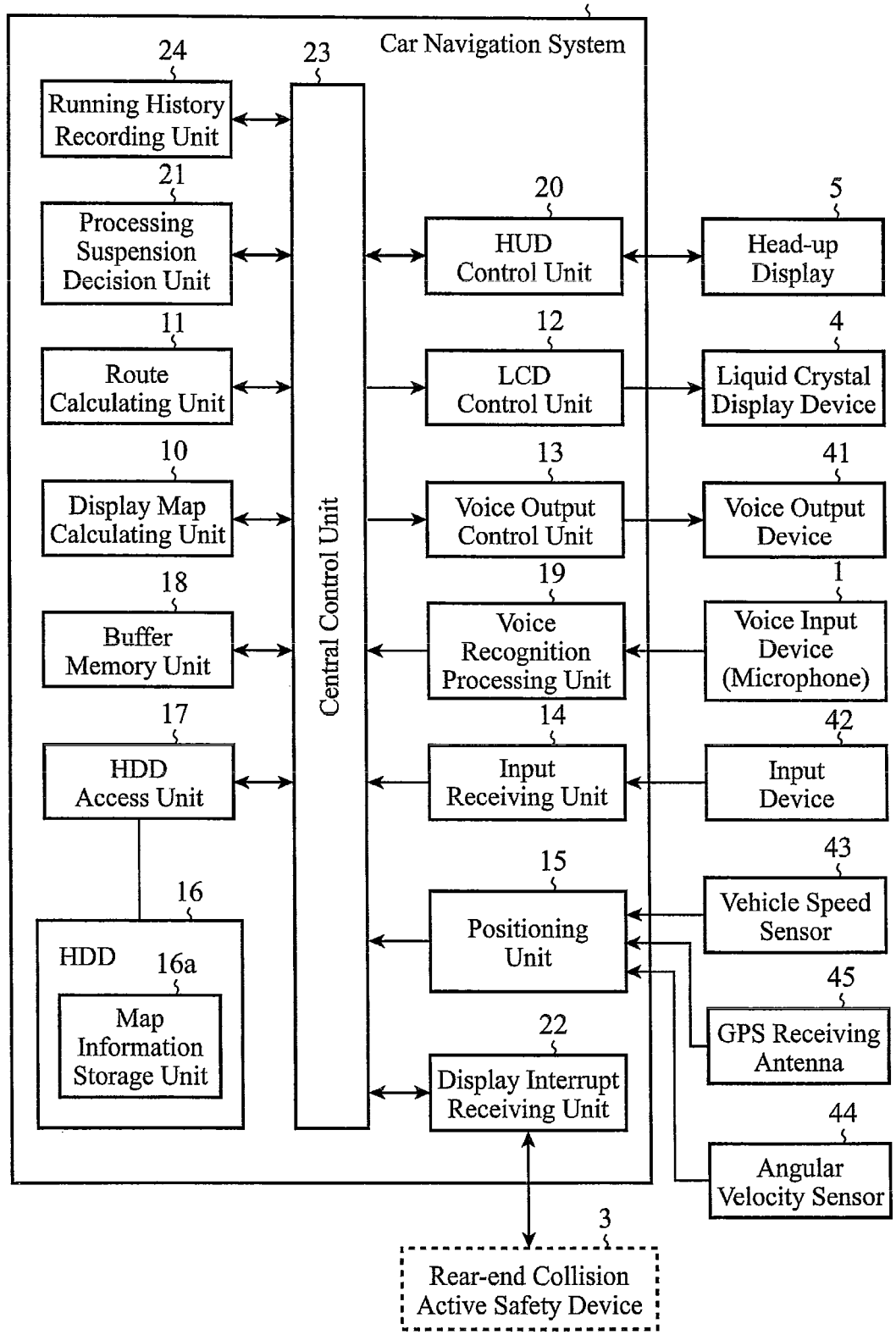
FIG. 10 is a block diagram showing a configuration of another car navigation system constituting the on-vehicle information providing device of the embodiment 2 in accordance with the present invention.

Furthermore, a configuration is also possible which uses the running history of the vehicle (record of the link IDs passed by) as shown in FIG. 9, and alters the threshold for deciding whether to suspend the display processing onto the head-up display 5 or not depending on whether the link ID the vehicle is currently running is contained in the running history. FIG. 10 is a block diagram showing a configuration of a car navigation system 2*a* for achieving the function.

The car navigation system 2*a* is configured by adding a running history recording unit 24 to the car navigation system 2 of the on-vehicle information providing device of the embodiment 1. The running history recording unit 24 accumulates and stores the number of times of the vehicle running the link IDs calculated from the coordinates of the current position of the vehicle delivered from the positioning unit 15. The number of times of running, which is recorded in the running history storage unit 24, is read out of the processing suspension decision unit 21.

While the vehicle is running on a road with the link ID with a large number of times of running, which is read from the running history recording unit 24, the processing suspension decision unit 21 increases the threshold for deciding whether to suspend the display processing onto the head-up display 5 or not. Thus, while the vehicle is running on the road with the large number of times of running, it makes it more difficult to suspend the display processing onto the head-up display 5, thereby making it easier to continue the voice operation.

As described above, according to the on-vehicle information providing device of the embodiment 2 in accordance with the present invention, since the user usually knows road conditions well as to the areas he or she runs often, it gives priority to continuing the voice operation of the car navigation system 2*a* over providing the active safety information by the rear-end collision active safety device 3.

Embodiment 3

Although the on-vehicle information providing device of the foregoing embodiment 1 terminates, when the display by the rear-end collision active safety device 3 begins, the voice operation by suspending the display processing by the car navigation system 2, the on-vehicle information providing device of the present embodiment 2 restarts, when receiving a display completion notification from the rear-end collision active safety device 3, the display processing onto the head-up display 5.

The configuration of the on-vehicle information providing device of the embodiment 3 in accordance with the present invention is the same as that of the on-vehicle information providing device of the foregoing embodiment 1.

Figure 11:
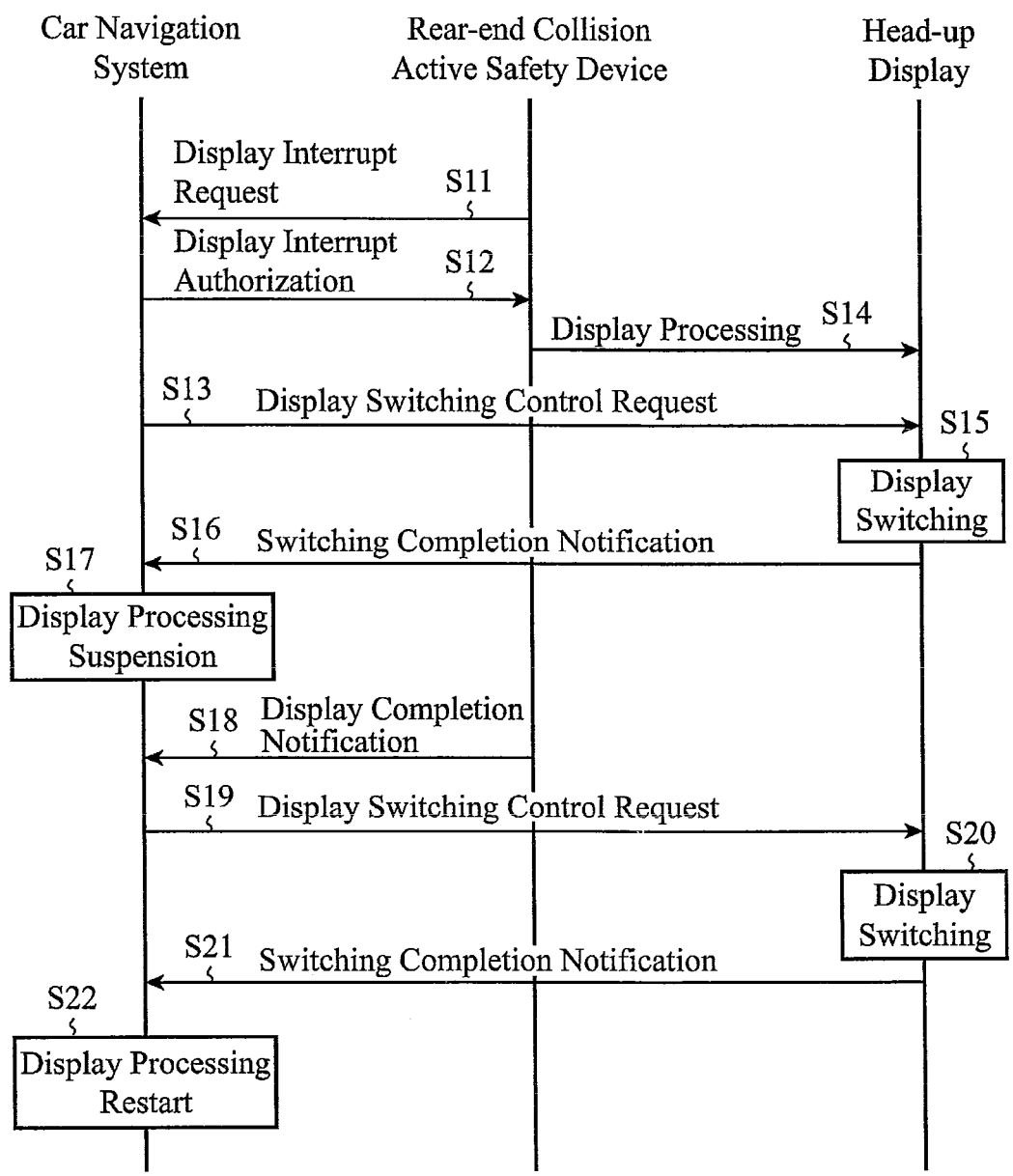
FIG. 11 is a sequence chart showing the operation of the on-vehicle information providing device of an embodiment 3 in accordance with the present invention.

Next, the operation of the on-vehicle information providing device of the embodiment 3 will be described with reference to the sequence chart shown in FIG. 11 centering on the operation in which the rear-end collision active safety device 3 causes an interrupt to the display processing the car navigation system 2 is executing to display a message on the head-up display 5, and then the car navigation system 2 restarts its display processing.

As to the operation from the step at which the rear-end collision active safety device 3 sends a display interrupt request to the car navigation system 2 to the step at which the display processing is suspended (S11-S17), it is the same as that of the on-vehicle information providing device of the embodiment 1 described with reference to FIG. 4. The processing suspension decision unit 21 of the car navigation system 2, receiving the display completion notification from the rear-end collision active safety device 3 after the display processing onto the head-up display 5 has been suspended (S18) delivers a display switching control request to the head-up display 5 via the HUD control unit 20 (S19).

The head-up display 5, receiving the display switching control request from the car navigation system 2, switches the interface to be used for the display from the second interface unit 52 to the first interface unit 51 (S20). Then, after completing the switching, it delivers the switching completion notification to the car navigation system 2 (S21). Receiving the switching completion notification from the head-up display 5 via the HUD control unit 20, the processing suspension decision unit 21 of the car navigation system 2 restarts the display processing onto the head-up display 5 (S22). Thus, even when the display processing onto the head-up display 5 by the car navigation system 2 is suspended by the interrupt from the rear-end collision active safety device 3, the display processing suspended is restarted. Accordingly, the user can continue the voice operation processing to the car navigation system 2.

Incidentally, a configuration is also possible which displays a message "Voice operation restarts now" on the head-up display 5 when restarting the display processing in the same manner as the on-vehicle information providing device of the foregoing embodiment 1. In addition, the car navigation system 2 can also be configured in such a manner as to continue the voice operation using the liquid crystal display device 4 which is the main display during the suspension of the display processing, and to switch to the voice operation using the head-up display 5 after receiving the display completion notification.

Figure 12:
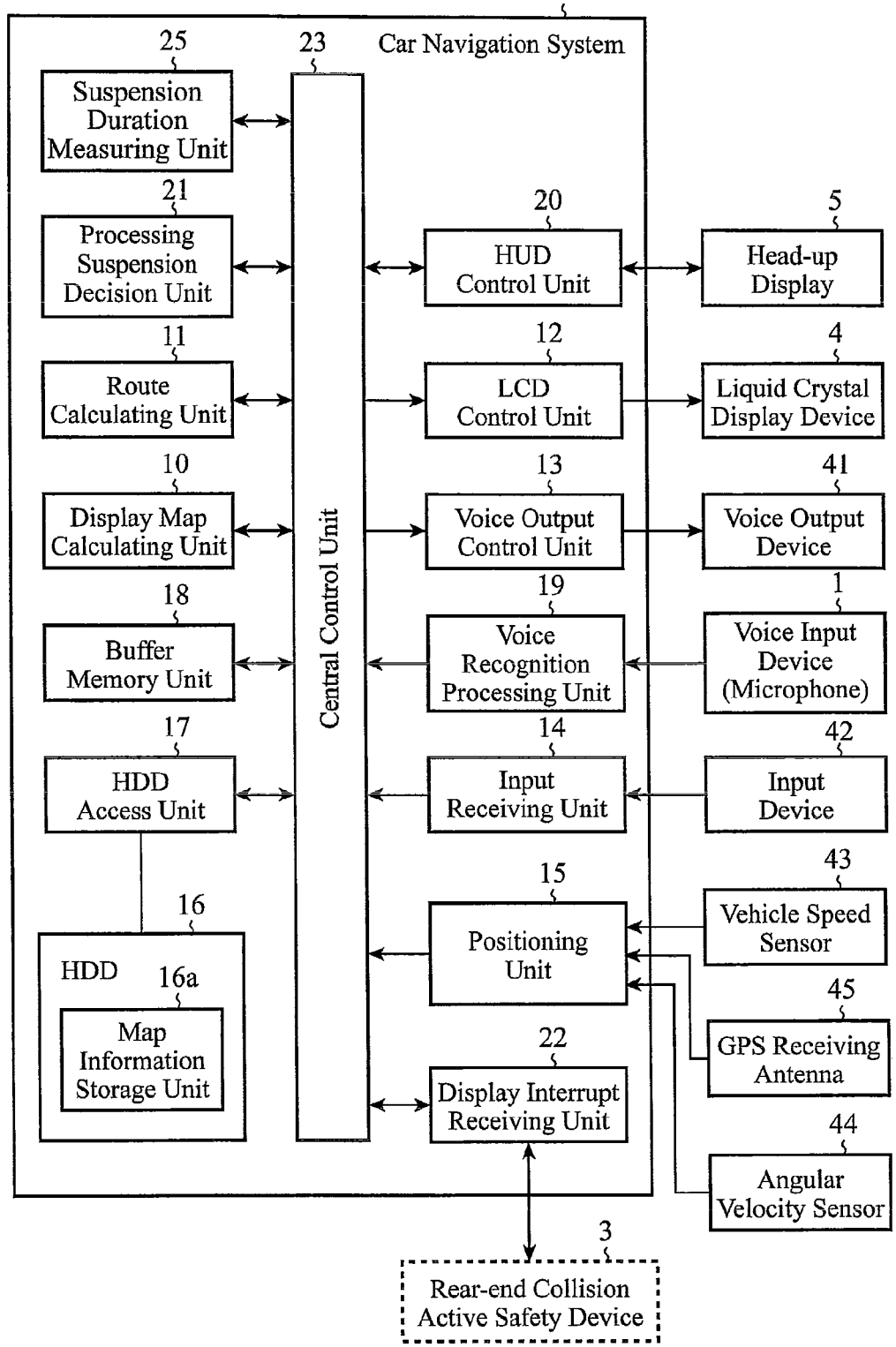
FIG. 12 is a block diagram showing a configuration of another car navigation system constituting the on-vehicle information providing device of the embodiment 3 in accordance with the present invention.

Furthermore, a configuration is also possible which measures the elapsed time from the suspension of the display processing to the display completion notification, and finishes, if the elapsed time measured exceeds a prescribed time period, the display processing without restarting the display processing. FIG. 12 is a block diagram showing a configuration of the car navigation system 2*b* for achieving the function. The car navigation system 2*b* is constructed by adding a suspension duration measuring unit 25 to the car navigation system 2 of the on-vehicle information providing device of the embodiment 1. The suspension duration measuring unit 25 measures the duration from the time when the display processing onto the head-up display 5 is interrupted to the time when it receives the display completion notification from the rear-end collision active safety device 3 by using a clock not shown. The duration measured by the suspension duration measuring unit 25 is delivered to the processing suspension decision unit 21.

The processing suspension decision unit 21 decides whether to restart the suspended display processing by comparing the duration delivered from the suspension duration measuring unit 25 with the threshold used for deciding a restart of the display processing. Then, if the duration delivered from the suspension duration measuring unit 25 is less than the threshold used for deciding the restart of the display processing, it restarts the display processing. On the other hand, if the duration delivered from the suspension duration measuring unit 25 is greater than the threshold used for deciding the restart of the display processing, it terminates the display processing. Thus, the voice operation is suspended.

Embodiment 4

Although the on-vehicle information providing device of the foregoing embodiment 1 suspends the display processing onto the head-up display 5 (interrupts the voice operation) regardless of the operation state, that is, regardless of the extent of the progress of the voice operation, the on-vehicle information providing device of the present embodiment 4 decides whether to suspend the voice operation in accordance with the operation state.

Figure 13:
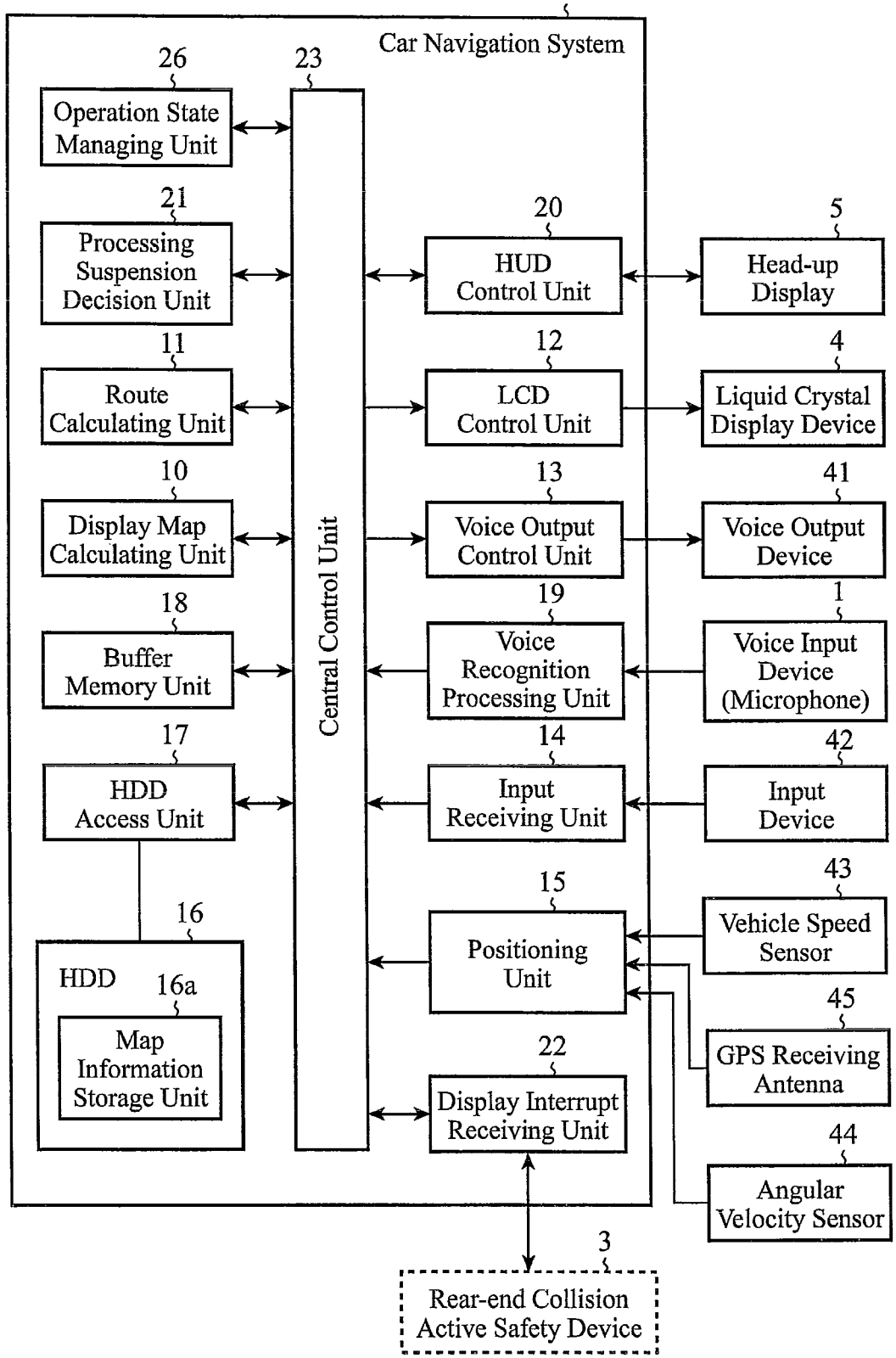
FIG. 13 is a block diagram showing a configuration of a car navigation system of an embodiment 4 in accordance with the present invention.

FIG. 13 is a block diagram showing a configuration of a car navigation system 2c of the present embodiment 4 in accordance with the present invention. The car navigation system 2c is constructed by adding an operation state managing unit 26 to the car navigation system 2 of the on-vehicle information providing device of the embodiment 1. The operation state managing unit 26 manages the extent of the progress of the voice operation for achieving a single function, the extent of the progress of an address search, for example, as the operation state. The operation state managed by the operation state managing unit 26 is delivered to the processing suspension decision unit 21.

According to the operation state delivered from the operation state managing unit 26, the processing suspension decision unit 21 alters the threshold used for making a decision of the display processing suspension onto the head-up display 5. Thus, in a case where the voice operation processing is suspended though the voice operation is almost completed, for example, the control of the display processing onto the head-up display 5 can be shifted from the car navigation system 2 to the rear-end collision active safety device 3 after completing the voice operation.

For example, in the address search as described in the embodiment 1, when the operation state is managed in accordance with levels such as "prefectural level", "local government level", "ooaza, chome level", and "house number level", and if the operation state has proceeded to "ooaza, chome level", the voice operation can be continued without suspension and the control of the display processing onto the head-up display 5 can be shifted from the car navigation system 2 to the rear-end collision active safety device 3 after completing the address search.

Incidentally, in the present embodiment 4, although the case of executing the address search is described as an example of the operation state, the foregoing function can be achieved for other processing such as a genre search by carrying out level management. In addition, the operation state managing unit 26 can be configured in such a manner as to manage the operation state using a ratio of completion to all the steps up to the completion of the operation.

As described above, according to the on-vehicle information providing device of the embodiment 4 in accordance with the present invention, it can continue the voice operation if the voice operation is almost completed depending on the degree of progress of the voice operation.

Embodiment 5

Although the on-vehicle information providing device of the foregoing embodiment 1 is configured in such a manner as to suspend the display processing onto the head-up display 5 regardless of the state or individual differences of the driver, the on-vehicle information providing device of the present embodiment 5 is configured in such a manner as to alter the threshold used for deciding whether to suspend the display processing onto the head-up display 5 or not in accordance with the skill of the driver, leeway of the driver or operation state of the driver, and to decide whether to continue the voice operation depending on whether the decision is made that the car navigation system 2 can be operated safely or not.
(1) Alteration According to Operation State of Driver The configuration of the car navigation system 2 for achieving the function of altering the threshold used for making a decision of the display processing suspension according to the operation state of the driver is the same as that of the car navigation system 2 of the foregoing embodiment 1.

As for latest vehicles, they can sense the operation state of steering (wheel) and of the accelerator and brake as the operation state of the driver. The car navigation system 2 alters the threshold used for making a decision of the display processing suspension in accordance with the operation state sensed.

Figure 15:
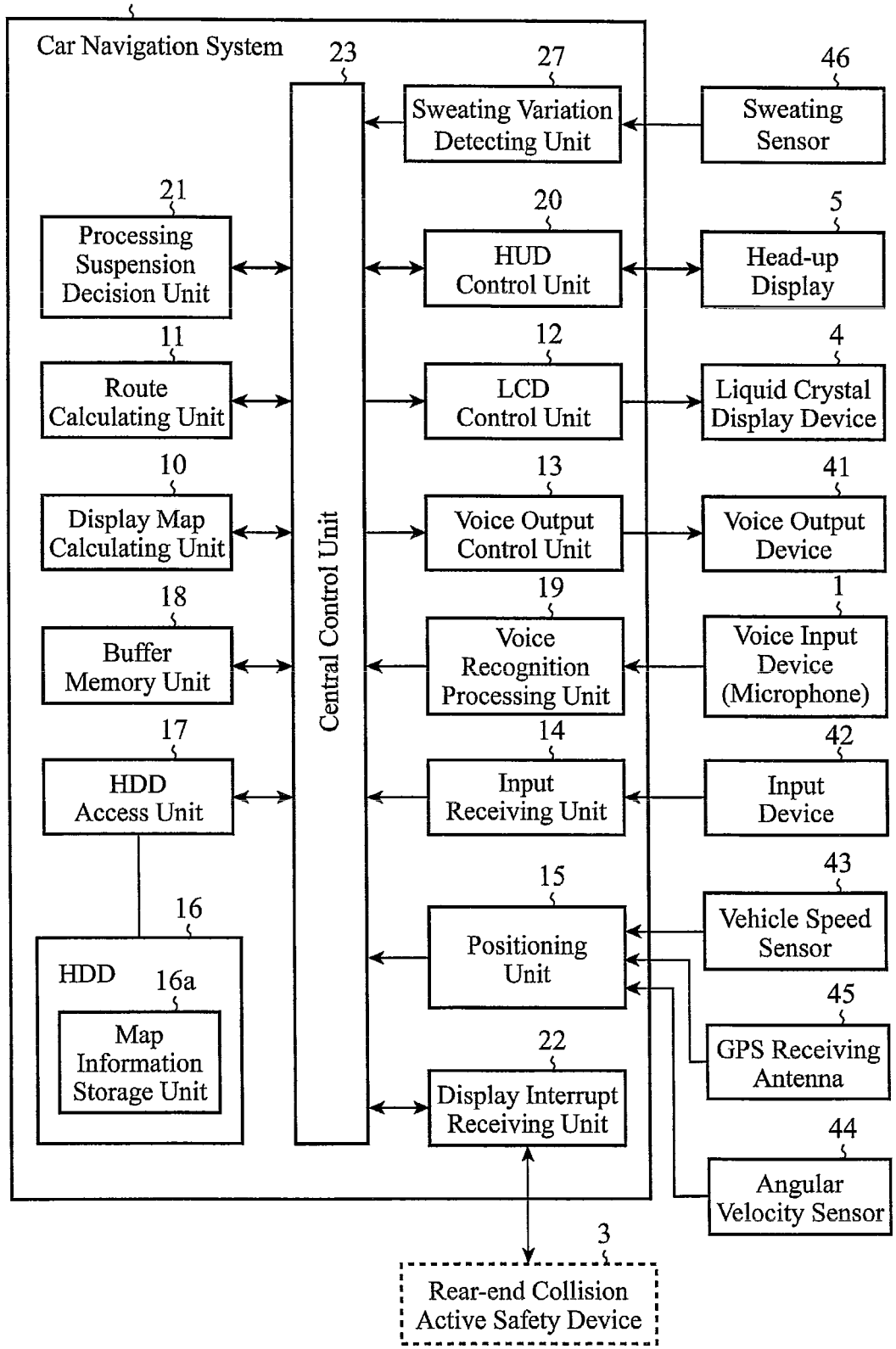
FIG. 15 is a block diagram showing a configuration of a car navigation system for altering a threshold in accordance with the leeway of driving in the on-vehicle information providing device of an embodiment 5 in accordance with the present invention.

Here, an example will be described which employs the operation angle of steering (referred to as "steering angle") as the information indicating the operation state of the driver. Assume that the steering angle sensed is P, and thresholds for the steering angle are p1, p2 and p3 (p1<p2<p3). In this case, having set the thresholds used for making a decision of the display processing suspension in connection with the steering angle as shown in FIG. 14 enables a configuration which alters the decision whether to continue the voice operation or not according to the operation state of the driver.
(2) Alteration According to Leeway of Driving FIG. 15 is a block diagram showing a configuration of a car navigation system 2d for achieving the function of altering the threshold used for making a decision of the display processing suspension according to the leeway of driving. The car navigation system 2d is constructed by adding a sweating sensor 46 and a sweating variation detecting unit 27 to the car navigation system 2 of the on-vehicle information providing device of the embodiment 1.

The sweating sensor 46 detects the amount of sweating of the driver at every fixed time interval, and delivers to the sweating variation detecting unit 27. Receiving the amount of sweating delivered from the sweating sensor 46 at every fixed time interval, the sweating variation detecting unit 27 calculates the difference between the amount of sweating received at present and the amount of sweating received previously, and delivers the difference to the processing suspension decision unit 21.

The processing suspension decision unit 21 decides the presence or absence of the leeway by comparing the difference delivered from the sweating variation detecting unit 27 with thresholds in a table for making a leeway decision stored in an internal storage in advance. In this case, a decision is made that there is no leeway if the variation in the amount of sweating on a driver's palm is large, and there is leeway if the variation is small. The processing suspension decision unit 21 controls the suspension of the display processing onto the head-up display 5 in accordance with the decision result of the leeway. FIG. 16 shows an example of the table for the leeway decision.

Incidentally, although the foregoing example expresses the leeway of driving in a binary of "having leeway" and "lacking in leeway", a configuration is also possible which decides whether to suspend the display processing or not using the variation of the amount of sweating directly as the leeway of driving.

In addition, although the foregoing example is configured in such a manner as to measure the leeway of driving by measuring the amount of sweating on the palm of the driver, other methods are possible which are configured in such a manner as to calculate the leeway by image recognition processing (pattern matching) of an expression of the driver, or to calculate the leeway by detecting a heart rate of the driver.

(3) Alteration According to Driving Skill

Figure 17:
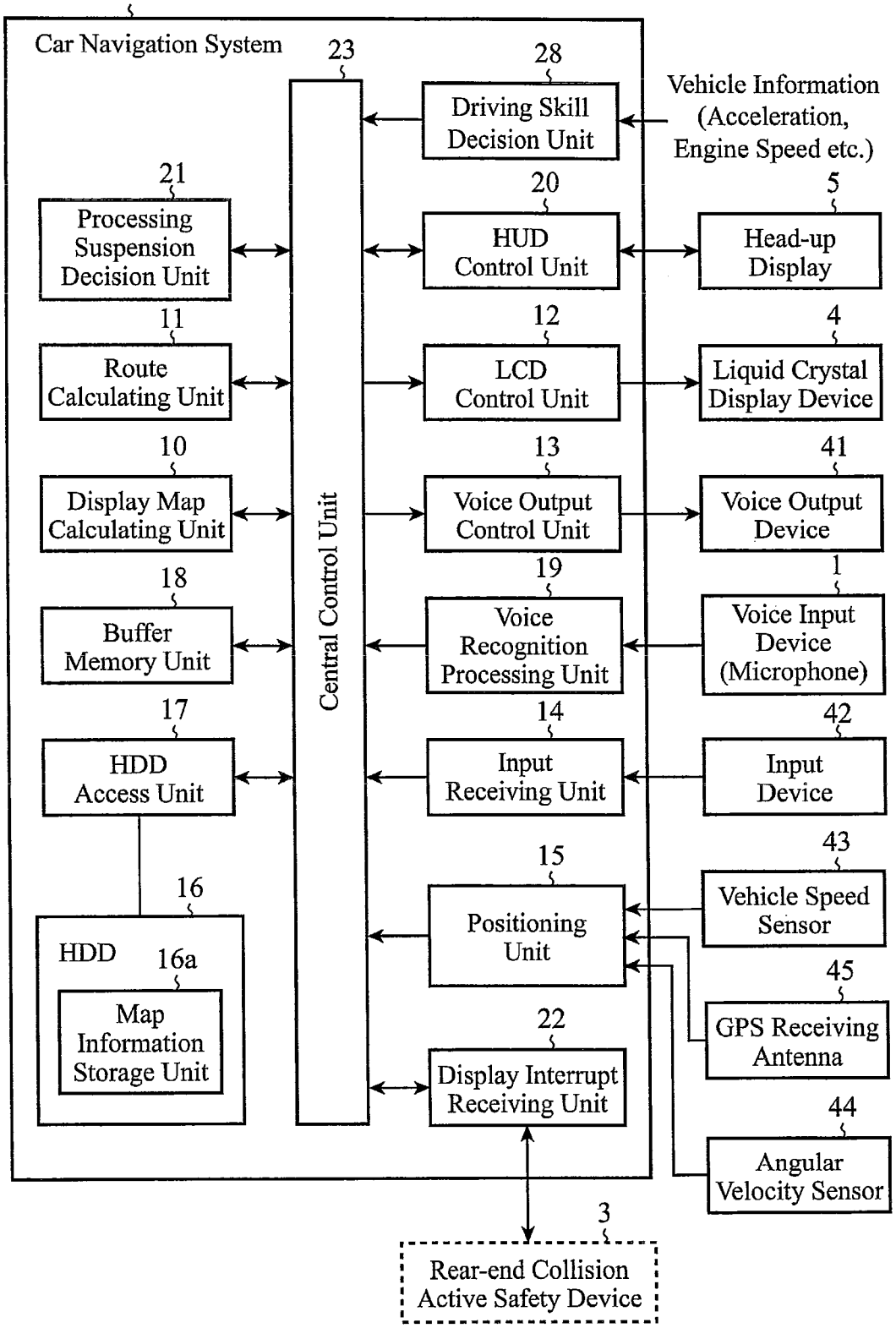
FIG. 17 is a block diagram showing a configuration of a car navigation system for altering a threshold in accordance with driving skill in the on-vehicle information providing device of the embodiment 5 in accordance with the present invention.

FIG. 17 is a block diagram showing a configuration of a car navigation system 2e for achieving the function of altering the threshold used for making a decision of the display processing suspension in accordance with driving skill. The car navigation system 2e is constructed by adding a driving skill decision unit 28 to the car navigation system 2 of the on-vehicle information providing device of the embodiment 1.

The driving skill decision unit 28 calculates a driving skill score by making a decision of the driving skill based on the vehicle information (acceleration, engine speed, operation of the accelerator pedal and brake pedal or the like) delivered from the vehicle. The driving skill score the driving skill decision unit 28 calculates is delivered to the processing suspension decision unit 21. Incidentally, as for the decision method of the driving skill, since Japanese Patent Laid-Open No. 05-196632/1993 or Japanese Patent Laid-Open No. 2003-81040 discloses it, refer to them as the need arises.

The processing suspension decision unit 21 decides the driving skill by comparing the driving skill score delivered from the driving skill decision unit 28 with thresholds in a table for the driving skill decision stored inside the device in advance, and controls the suspension of the display processing onto the head-up display 5 in accordance with the decision result. FIG. 18 shows an example of the table for the driving skill decision. It is assumed in this table that the driving skill calculated by the driving skill decision unit 28 is represented by Q, and the thresholds set for the driving skill in advance are represented by $q_1$, $q_2$, and $q_3$.

Embodiment 6

The on-vehicle information providing device of an embodiment 6 in accordance with the present invention is configured in such a manner as to alter the threshold used for making a decision of the display processing suspension in accordance with the vehicle state or vehicle surrounding state (referred to as "external conditions of the vehicle" from now on), and to decide whether to continue the voice operation or not depending on whether an estimate is made that the car navigation system can be operated safely or not.

(1) Alteration According to Vehicle State

The configuration of the car navigation system 2 for achieving the function of altering the threshold used for making a decision of the display processing suspension in accordance with the vehicle state is the same as that of the on-vehicle information providing device of the foregoing embodiment 1. As the vehicle state, a state whether the vehicle is running or stopped is used.

The processing suspension decision unit 21 receives the vehicle speed pulse from the vehicle speed sensor 43 via the positioning unit 15, and decides on whether the vehicle is running or not from the vehicle speed pulse. In this case, the vehicle speed sensor 43 corresponds to a vehicle state acquiring unit in accordance with the present invention. The processing suspension decision unit 21 sets the threshold at $c_1$ when the vehicle is running or at $c_2$ ($c_2 > c_1$) when it is stopped, thereby facilitating the continuation of the voice operation while it is standing.

(2) Alteration According to External Conditions of Vehicle

Figure 19:
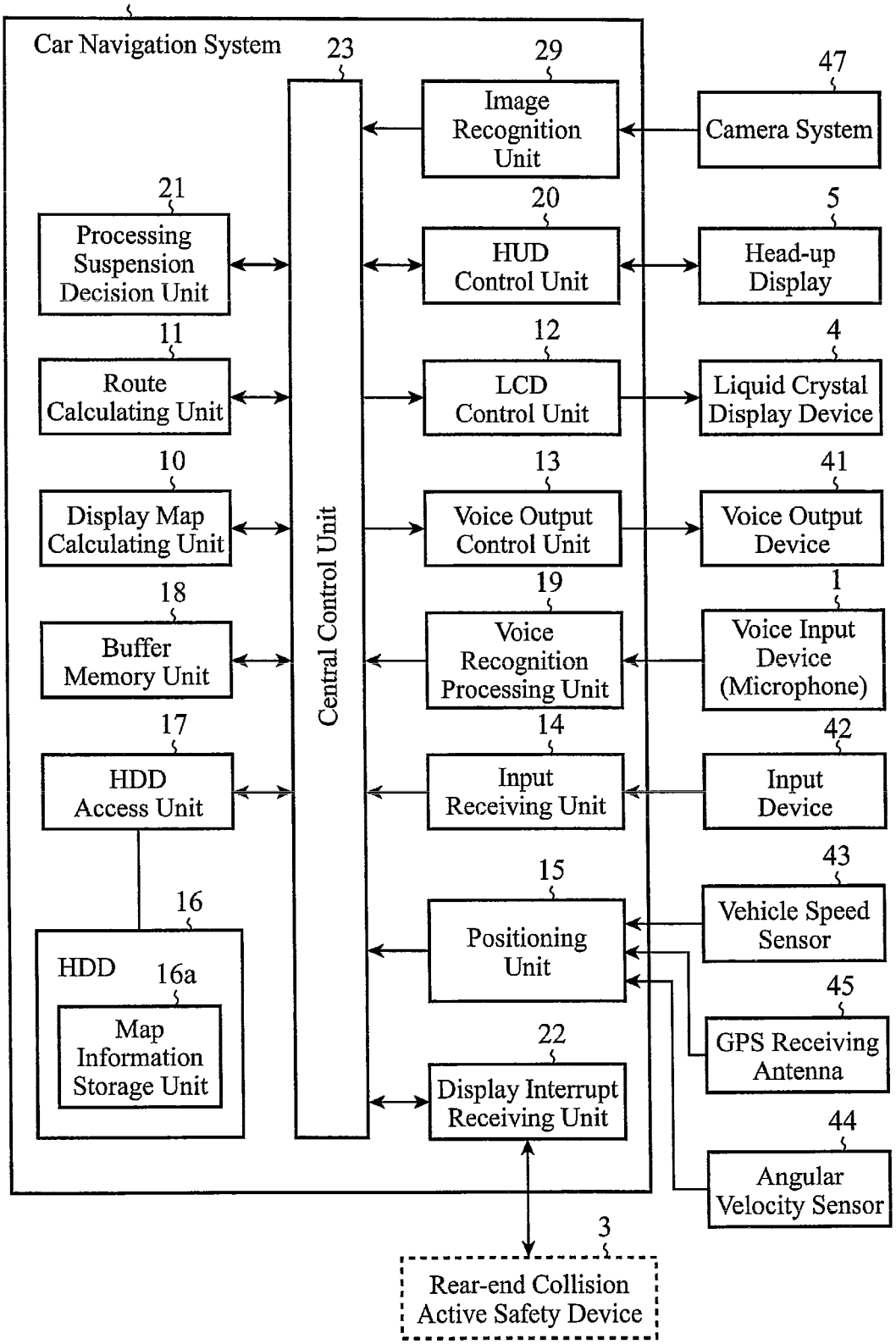
FIG. 19 is a block diagram showing a configuration of a car navigation system for altering a threshold in accordance with external conditions of the vehicle in the on-vehicle information providing device of an embodiment 6 in accordance with the present invention.

FIG. 19 is a block diagram showing a configuration of a car navigation system 2f for achieving the function of altering the threshold used for making a decision of the display processing suspension in accordance with the external conditions of the vehicle. The car navigation system 2f is constructed by adding a camera system 47 and an image recognition unit 29 to the car navigation system 2 of the on-vehicle information providing device of the embodiment 1.

The camera system 47, which corresponds to an external condition acquiring unit in accordance with the present invention, is composed of a plurality of cameras mounted on the vehicle. The camera system 47 takes pictures around the vehicle at every fixed time interval, and delivers image signals obtained by the photographing to the image recognition unit 29. The image recognition unit 29 receives the image signals delivered from the camera system 47 at every fixed time interval, and recognizes as to whether there is a person around the vehicle from the image signals received. The recognition result by the image recognition unit 29 is delivered to the processing suspension decision unit 21.

The processing suspension decision unit 21 decides the presence or absence of a person by comparing the recognition result delivered from the image recognition unit 29 with thresholds stored in advance within the device, and controls the suspension of the display processing onto the head-up display 5 in accordance with the decision result. In this case, assuming that the threshold in the case where a person is present is $c_3$, and the threshold in the case where a person is not present is $c_4$ ($c_4 > c_3$) makes it easier to continue the voice operation when there is no person around the vehicle.

INDUSTRIAL APPLICABILITY

As described above, since the on-vehicle information providing device in accordance with the present invention is configured in such a manner that when a display interrupt request is made from the active safety system during the display processing onto the head-up display, it suspends the processing and sends a display switching control request to the head-up display, and that the head-up display switches, in response to the request, to the mode of displaying the information about the active safety system, it can provide the information from the active safety system quickly and prevent the operation of the on-vehicle information equipment having been carried out so far from coming to nothing. Thus, it is suitable for the application to a car navigation system and the like.

What is claimed is:
1. An on-vehicle information providing device comprising:
an input device for inputting information corresponding to operation;

an on-vehicle information device for executing processing corresponding to the information input from the input device;

a vehicle safety device for generating caution information to a driver of a vehicle;

a first display device for displaying a processing result of the on-vehicle information device; and a second display device for displaying information delivered from the on-vehicle information device or from the vehicle safety device, wherein said on-vehicle information providing device, wherein the on-vehicle information device, while executing display processing onto the second display device, suspends the display processing and sends a display switching control request to the second display device in response to a display interrupt request from the vehicle safety device;

the second display device switches, in response to the display switching control request from the on-vehicle information device, from a state of displaying the information from the on-vehicle information device to a state of displaying the information from the vehicle safety device;

the on-vehicle information device comprises a processing suspension decision unit for deciding whether to suspend the display processing onto the second display device;

the vehicle safety device delivers a display emergency level and a display interrupt request to the on-vehicle information device; and the processing suspension decision unit of the on-vehicle information device decides whether to suspend the display processing by comparing the emergency level received from the vehicle safety device with a preset threshold used for making a decision of display processing suspension.

2. The on-vehicle information providing device according to claim 1, wherein the on-vehicle information device comprises a positioning unit for calculating the position of the vehicle; and the processing suspension decision unit alters the threshold used for making a decision of the display processing suspension in accordance with the position of the vehicle calculated by the positioning unit.

3. The on-vehicle information providing device according to claim 2, wherein the on-vehicle information device comprises a running history recording unit for recording positions of the vehicle calculated by the positioning unit; and the processing suspension decision unit alters the threshold used for making a decision of the display processing suspension in accordance with the position of the vehicle calculated by the positioning unit and the positions of the vehicle recorded in the running history recording unit.

4. The on-vehicle information providing device according to claim 1, wherein the on-vehicle information device comprises an operation state managing unit for managing an operation state representing an extent of progress of an operation; and the processing suspension decision unit alters the threshold used for making a decision of the display processing suspension in accordance with the operation state managed by the operation state managing unit.

5. The on-vehicle information providing device according to claim 1, wherein the on-vehicle information device comprises a driving skill decision unit for making a decision of driving skill of the driver; and the processing suspension decision unit alters the threshold used for making a decision of the display processing suspension in accordance with the driving skill decided by the driving skill decision unit.

6. The on-vehicle information providing device according to claim 1, wherein the on-vehicle information device comprises a leeway detecting unit for detecting leeway of the driver; and the processing suspension decision unit alters the threshold used for making a decision of the display processing suspension in accordance with the leeway detected by the leeway detecting unit.

7. The on-vehicle information providing device according to claim 1, wherein the vehicle safety device sends display duration of the caution information to the on-vehicle information device; and the on-vehicle information device alters the threshold used for making a decision of the display processing suspension in accordance with the display duration received from the vehicle safety device.

8. The on-vehicle information providing device according to claim 1, wherein the on-vehicle information device comprises a vehicle state acquiring unit for acquiring a vehicle state; and the processing suspension decision unit alters the threshold used for making a decision of the display processing suspension in accordance with the vehicle state acquired by the vehicle state acquiring unit.

9. The on-vehicle information providing device according to claim 1, wherein the on-vehicle information device comprises an external condition acquiring unit for acquiring external conditions of the vehicle; and the processing suspension decision unit alters the threshold used for making a decision of the display processing suspension in accordance with the external conditions of the vehicle acquired by the external condition acquiring unit.

10. The on-vehicle information providing device according to claim 1, wherein the processing suspension decision unit of the on-vehicle information device acquires an operation state of the driver, and alters the threshold used for making a decision of the display processing suspension in accordance with the operation state of the driver acquired.

11. The on-vehicle information providing device according to claim 1, wherein the vehicle safety device sends a display completion notification to the on-vehicle information device when the display processing has been completed; and the on-vehicle information device restarts, when receiving the display completion notification from the vehicle safety device, the display processing onto the second display device which has been suspended.

12. The on-vehicle information providing device according to claim 11, wherein the on-vehicle information device comprises a suspension duration measuring unit for measuring duration from time of suspending the display processing onto the second display device to time of receiving the display completion notification from the vehicle safety device; and the processing suspension decision unit decides whether to restart the display processing which has been suspended by comparing the duration measured by the suspension duration measuring unit with a threshold used for deciding restart of the display processing.

13. The on-vehicle information providing device according to claim 1, wherein
the on-vehicle information device suspends, when receiving a display interrupt request from the vehicle safety device, the display processing onto the second display screen, and executes the display processing onto the first display screen.

14. The on-vehicle information providing device according to claim 1, wherein
the on-vehicle information device causes, when suspending the display processing onto the second display screen, the first display screen or second display screen to display a notice so stating.

15. The on-vehicle information providing device according to claim 11, wherein
the on-vehicle information device causes, when restarting the display processing onto the second display screen, the first display screen or second display screen to display a notice so stating.

16. The on-vehicle information providing device according to claim 1, further comprising:
an illuminance detecting unit for detecting surrounding illuminance, wherein
the second display device varies luminance of its display in accordance with the illuminance detected by the illuminance detecting unit.

* * * * *